US008792908B2

(12) United States Patent
Youssef et al.

(10) Patent No.: US 8,792,908 B2
(45) Date of Patent: Jul. 29, 2014

(54) METHOD AND APPARATUS FOR DETERMINING POSITION OF A WIRELESS DEVICE

(76) Inventors: Mohamed Youssef, Richmond (CA); Naser El-Sheimy, Edmonton (CA); Michel Fattouche, Calgary (CA)

(*) Notice: Subject to any disclaimer, the term of this patent is extended or adjusted under 35 U.S.C. 154(b) by 58 days.

(21) Appl. No.: 13/538,672

(22) Filed: Jun. 29, 2012

(65) Prior Publication Data

US 2013/0172019 A1 Jul. 4, 2013

Related U.S. Application Data

(60) Provisional application No. 61/503,506, filed on Jun. 30, 2011.

(51) Int. Cl.
*H04W 24/00* (2009.01)

(52) U.S. Cl.
USPC ........................................ 455/456.1

(58) Field of Classification Search
USPC ................ 455/456.1–457; 702/127, 179; 705/14.4–14.67
See application file for complete search history.

(56) References Cited

U.S. PATENT DOCUMENTS

| 2003/0064735 A1* | 4/2003 | Spain et al. ............... 455/456 |
| 2004/0198392 A1* | 10/2004 | Harvey et al. ............. 455/456.1 |
| 2008/0268873 A1* | 10/2008 | Wymeersch et al. ...... 455/456.6 |
| 2010/0153064 A1* | 6/2010 | Cormode et al. ............ 702/179 |

FOREIGN PATENT DOCUMENTS

WO       WO 03071303 A1 *  8/2003    ............... G01S 5/14

* cited by examiner

*Primary Examiner* — Daniel Lai
(74) *Attorney, Agent, or Firm* — Marsh Fischmann & Breyfogle LLP; Jonathon A. Szumny

(57) ABSTRACT

A method and apparatus for determining the location of a device capable of receiving/transmitting wireless signals from/to reference stations is provided, for example providing wireless signals in the form of range information to the device; determining a region or area surrounding each reference station, wherein regions intersect to form intersecting spaces; defining the intersecting spaces to delineate a device location search space and determining device locations within the search space; determining combinations of said device locations, and using a distribution analysis test to examine a skewness value of each combination; detecting and selecting the combinations of device positions that result in a minimum skewness value or simply a combination that provides skewness value less than a pre-defined minimum threshold value; and utilizing the detected and selected combinations to determine a refined final position of the device.

22 Claims, 13 Drawing Sheets ional appli-
METHOD AND APPARATUS FOR DETERMINING POSITION OF A WIRELESS DEVICE

CROSS-REFERENCE

This application claims priority as non-provisional application of U.S. Provisional Application No. 61/503,506, filed Jun. 30, 2011, entitled "METHOD FOR DETERMINING POSITION OF A WIRELESS DEVICE", the entirety of which is hereby incorporated by reference.

TECHNICAL FIELD

The present invention relates to a method and apparatus for determining the position of a wireless device, wherein the device can receive/transmit signals in the form of range information from/to reference stations.

BACKGROUND

Wireless location/positioning techniques, commonly referred to as "radiolocation" or "geolocation", which is typically given in terms of geographic coordinates, refers to the method of obtaining the positional information of a device using wireless systems. For example, wireless positioning techniques used to determine the location of radio devices, and have resulted in a multitude of new applications and services such as outdoor person/asset tracking, enhanced 911 services, location sensitive billing, fraud protection, fleet management, intelligent transportation systems, cellular system design and management, and mobile yellow pages. One form of wireless location technology, known as infrastructure wireless systems, can be divided into two main categories:

- hand-set based systems, which determine the location of a hand-held radiodevice (e.g. a GPS receiver or a cellular phone) by having the hand-held device receive and process signals received from pre-determined reference stations (e.g. global navigation satellite systems, base stations and/or wireless access points) to determine its location; and
- network-based systems, which attempt to determine the position of a device by measuring and processing its signal parameters as they are received at pre-determined reference stations.

Different positioning techniques for locating or "fixing" wireless devices within infrastructure systems are known, particularly where the device is capable of receiving/transmitting a radio signal transmitted/received from/by reference stations having a known position. For instance, localization of a device in infrastructure based systems may be achieved by estimating ranges (i.e. distances) between the device to be located/positioned and the reference stations using known "ranging measurement techniques" such as, for example, Received Signal Strength, Time-Of-Arrival, Round Trip Delay, and Time-Difference-Of-Arrival based techniques.

These techniques, however, can suffer from ranging (propagation delay) errors, and it is therefore a main objective of a positioning technique to minimize the effect of the ranging measurement error on the positioning error. For instance, processing propagation delay estimates from "direct path" signals can be an effective ranging measurement technique for more accurately positioning a wireless device. However, large ranging errors can arise, over "multipath" signals, or in circumstances where the Signal-to-Noise Ratio (SNR) received by the device is weak.

Numerous attempts have been made to mitigate large propagation delay errors, such as, for example:

- limiting the received signal strength (i.e. SNR) to a certain SNR threshold value which should be above the SNR value of the threshold region; or
- accumulating the received signal in an attempt to increase the received SNR value to be greater than the SNR value of the threshold region.

Other known techniques for mitigating large propagation delay errors include the use of robust estimation techniques (e.g. M-estimator) at the positioning/navigation stage to provide robustness against biased propagation delay errors, where the errors might arise due to propagation delay being estimated from weak signals. However, such techniques provide robustness against propagation delay bias at the cost of degrading the positioning accuracy. In addition, some of these techniques require a predetermined value, which can vary depending upon the propagation environment. Indeed, some studies examining Cramer-Rao Lower Bound (CRLB) have recommended the detection and rejection of propagation delay observations having large delay errors (i.e. bias), rather than estimating and removing their respective biases. However, the distribution of the propagation delay (i.e. pseudorange) measurement hypothesis is usually unknown.

There is a need, therefore, for a reliable wireless location solution that does not require the assumption of either the distribution of the propagation delay estimate or any external source of positioning information, and that can provide a real-time robust detection technique, which can detect and reject the biased propagation delays regardless of either the distribution of the propagation delay estimates or the propagation environment.

SUMMARY

An improved method and apparatus for estimating or fixing the position of a wireless device is provided, where the device is capable of receiving or transmitting signals (e.g. radio signals) from/to reference stations (e.g. GNSS satellites).

More specifically, a method and apparatus for determining the location of a device capable of receiving/transmitting wireless signals from/to reference station(s) is provided, the method including providing wireless signals in the form of range information to the device, from at least three reference stations; determining a region or area surrounding each reference station, where each region surrounding each reference station intersects with at least one region surrounding at least one other reference station to form at least one intersecting space; defining the at least one intersecting space to delineate a device location search space, determining locations of the device within the device location search space, determining combinations of said device locations, and using a distribution analysis test to examine a skewness value of each combination; detecting and selecting the combinations of device positions that result in a minimum skewness value or a combination that provides a skewness value less than a pre-defined minimum threshold value; and utilizing the detected and selected combinations to determine a refined final position of the device.

An apparatus/device, enabled to determine its location/position, where the device is capable of receiving/transmitting wireless signals from/to reference station(s) is provided, the apparatus/device including receiver/transmission means for receiving/transmitting wireless signals from/to at least three reference stations; processing means capable of receiving the wireless signals and: determining a region or area surrounding each reference station, where the region surrounding one reference station intersects with at least one region surrounding at least one other reference station to form at least one intersecting space; defining the at least one intersecting space to delineate a device location search space, determining locations of the device within the receiver location search space, determining combinations of said receiver locations, and using a distribution analysis test to examine a skewness value of each combination; detecting and selecting the combinations of device positions that result in a minimum skewness value or a combination that provides skewness value less than a pre-defined minimum threshold value, and utilizing the detected and selected combinations to determine a refined final position of the device.

DESCRIPTION OF EMBODIMENTS

An improved method and apparatus for estimating or fixing the position of a device, such as a radio device, is provided, where the device is capable of receiving/transmitting signals in the form of range information from/to a plurality of reference stations. More specifically, the present method and apparatus provide a positioning technique that reduces the effect of ranging measurement error on the positioning error, that is, per delay estimate, in circumstances where the propagation delay estimate may be unbiased Additive White Gaussian (AWG), or a scenario where the propagation delay estimate may be biased AWG.

By way of background, current positioning techniques are known to offer a solution for the foregoing biased scenario based on estimating an extra parameter, which is the bias in the ranging estimate. Numerous solutions have been developed that are capable of detecting biased estimates. The problem of detecting biased estimates is generally modeled as a binary hypothesis problem. The probability density function (PDF) of the ranging measurements under the unbiased hypothesis is usually known except for its mean, which is determined by the true range. If the distribution under the biased hypothesis is also known, then the detection problem can be solved using current hypothesis testing solutions. However, the PDF of ranging measurements under the biased hypothesis is typically unknown, and thus a detection technique, which does not assume the knowledge of the biased PDF is presented.

Figure 1:
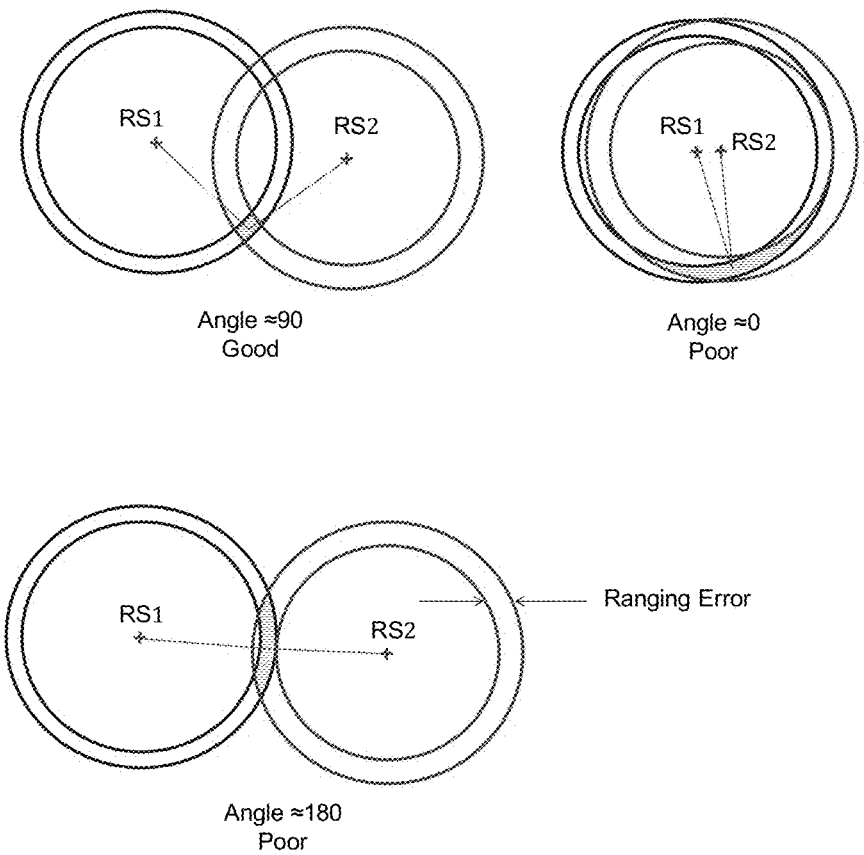
FIG. 1 shows the effect of Geometrical Dilution of Precision (GDOP) as a function of the ranging error (showing the different positioning errors as the shaded areas)

Referring now to FIG. 1, the effect of Geometrical Dilution of Precision (GDOP) is shown as a function of the ranging error (showing the different positioning errors as the shaded areas).

The present method or selection technique, referred to herein as the "SNOD" technique, can be based upon the Skew-Normal (SN) distribution. The SN class of PDFs is capable of extending the Gaussian distribution model by allowing a shape parameter to account for its skewness, and therefore encompass a large number of popular distributions.

More specifically, a method is provided for determining the location of a device, wherein the device is capable of receiving/transmitting wireless signals from/to at least one reference station(s) having the following steps:

(a) providing wireless signals in the form of range information to the device, (i.e. information that can be reflective of the distance between a reference station and a receiver), from more than one reference stations, for example, at least three reference stations.

In some embodiments, the device can be a portable radio device, such as a mobile phone, Global Positioning System device, or the like, or a beacon device. The range information may be in the form of wireless signals, such as radio or sound signals.

A reference station can be in the form of any station having known coordinates, such as Cellular Base-Stations, GNSS satellite, WLAN/Wi-Fi Routers, and Base-Stations for Network-based location.

Figure 2:
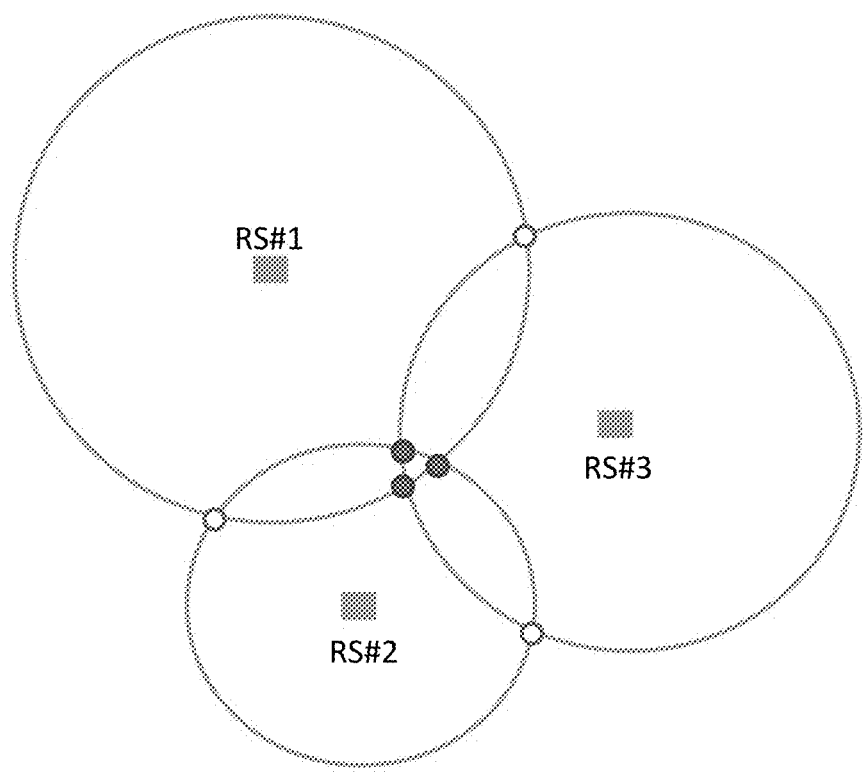
FIG. 2 shows six possible location estimates or "crossings", which are formed from the intersection of three circles or regions formed around one RS (Reference Station, for example a base station, wireless node, access point, or otherwise) with the radius of each circle corresponding to its respective time delay estimate (solid circles denote clustered crossings, open circles denote non-clustered crossings)

In some embodiments, the device may be a radio device capable of receiving/transmitting wireless radio signals in the form of range information from/to at least three reference stations, such as a Cellular Base Stations. The device is capable of processing the received radio signal to extract ranging information. As such, the device may be equipped with a processor capable of using, for example, techniques such as Matched filter(s) or correlator(s), followed by a peak detector. It is understood that any such super-resolution technique could be used to process and extract ranging information;

(b) determining a region or area surrounding each reference station(s), wherein the region surrounding each reference station intersects with at least one region surrounding at least one other reference station(s) to form intersecting spaces (see FIG. 2).

In some embodiments, a region surrounding a reference station can be in the form of a circle, having a diameter or radius that may be determined. It is contemplated that the region may be any shape or size of region surrounding the reference station.

(c) defining the at least one intersecting spaces to delineate a device location search space, (d) determining possible locations of the device within the device location search space, (e) determining combinations of said possible device locations, and using a distribution analysis test to examine the skewness value of each combination.

In some embodiments, the distribution analysis or "skewness test" may comprise a (sampled) mean minus (sampled) median analysis. In some embodiments, the skewness test may be a conventional skewness and Kurtosis analysis, (f) detecting and selecting the combinations of device positions that resulted in a minimum skewness value or simply a combination that provides skewness value less than a pre-defined minimum threshold value. The pre-defined minimum skewness threshold value may be based on system design parameters such as system bandwidth and the minimum target SNR value as could be determined by a person skilled in the art, and (g) utilizing the detected and selected combinations to determine a refined final position of the device.

It is contemplated that the final position of the device may be determined in a two-dimensional (2D) or a three-dimensional (3D) scenario.

An apparatus/device capable of receiving/transmitting wireless signals in the form of range information from/to reference station(s) is further provided, the device comprising:

(a) receiver/transmission means for receiving/transmitting wireless signals from/to at least three reference stations.

In some embodiments, the device may be a portable radio device, such as a mobile phone, Global Positioning System device, or the like, or a beacon device. The range information may be in the form of wireless signals, such as radio or sound signals.

Reference stations may be in the form of any station having known coordinates, such as Cellular Base-Stations, GNSS satellite, WLAN/Wi-Fi Routers, and Base-Stations for Network-based location.

In some embodiments, the device may be a radio device capable of receiving/transmitting wireless radio signals in the form of range information from/to at least three reference stations, such as a Cellular Base Stations. Where the signal is received from a reference station, the device is capable of processing the received signal to extract ranging information. As such, the device may be equipped with a processor capable of using, for example, techniques such as Matched filter(s) or correlator(s), followed by a peak detector. It is understood that any such super-resolution technique could be used to process and extract ranging information.

(b) processing means capable of receiving the wireless signals (range information) and:

(i) determining a region or area surrounding each reference station, wherein the region surrounding one reference station intersects with at least one region surrounding at least one other reference station to form intersecting space(s) (see FIG. 2);

In some embodiments, a region surrounding a reference station may be in the form of a circle, having a diameter or radius that may be determined. It is contemplated that the region may be any shape or size of region surrounding the reference station.

(ii) defining the intersecting spaces to delineate a device location search space, (iii) determining possible locations of the device within the device location search space, (iv) determining combinations of said device locations, and using a distribution analysis test to examine the skewness value of each combination.

In some embodiments, the distribution analysis or "skewness test" may comprise a (sampled) mean minus (sampled) median analysis. In some embodiments, the skewness test may be a conventional skewness and Kurtosis analysis, (v) detecting and selecting the combinations of device positions that resulted in a minimum skewness value or simply a combination that provides skewness value less than a pre-defined minimum threshold value. The pre-defined minimum skewness threshold value may be based on system design parameters such as system bandwidth and the minimum target SNR value as could be determined by a person skilled in the art, and (vi) analyzing the detected and selected combinations to determine a refined final position of the device.

It is contemplated that the present method and apparatus may provide the present location of a device by providing any processing or computation taking place at the radio device itself, which might be the case in handset positioning or at the network server in case on Network based location. In the alternative, it is contemplated that, in handset positioning, the present method and apparatus may provide the present location of a device by collecting raw digitized signal(s) and send it(them) back to a hosted-server using TCP/IP protocol, where the positioning computation takes place on the hosted-server. Such a technique has been called "capture then process" or "push-to-fix".

Without any limitation to the foregoing, the present method and apparatus is further described by way of the following examples.

EXAMPLES

In the circumstance of a propagation delay estimation, where a radio device (e.g. a mobile device or a GPS receiver) with an unknown location receives a radio signal from a number of RSs with known locations (e.g. Cellular Base-Stations or GPS satellites), it can be assumed, without the loss of any generality, that the position of the radio device is estimated using hand-set based wireless location. In other words, wireless location, can be performed based on the delay estimates obtained from all RSs.

Let $R=\{1, 2 \ldots, R\}$ be the set of indices of the RSs, whose positions $(p_r=(x_r,y_r)^T, r \in R)$ are known. Let $NL=k_1, k_2, \ldots, k_N$, where NL indicates NLOS measurements, be a set of biased estimates, which can be relabeled as $(1, 2, \ldots, N)$. Let the complement of NL, be denoted as $L=R-NL$, where L indicates LOS measurements (i.e. the set of unbiased estimates). The parameters to be estimated are the position $\hat{p}=(x, y)^T$ of the radio device and the N propagation induced path length biases, $l=(l_1, l_2, \ldots, l_N)^T$, with $l_i>0, \forall i, i=1, \ldots, N$. For convenience, we define an (N+2)-dimensional vector $\theta$ by concatenating the unknown p and l parameters.

$$\theta=(x,y,l_1,l_2,\ldots,l_N)^T \quad (1)$$

A delay estimate can be approximated as $$\hat{\tau}_r=\tau_r+n_r, \text{ for } r \in R \quad (2)$$

where the delay $\tau_r$ is $$\tau_r = \frac{1}{c}\left(\sqrt{(x_r - x)^2 + (y_r - y)^2} + l_r\right), \text{ for } r \in R \quad (3)$$

with $l_r=0$ for r∈L, and the estimation error $n_r$ in (12) conforms to a Gaussian distribution $N(0,\sigma_r^2)$ with zero mean and variance $\sigma_r^2$.

This leads the $r^{th}$ unbiased estimates to have a Gaussian pdf $N(\mu_{DP},\sigma_{DP}^2)$ with mean $\mu_{DP}$ and variance $\sigma_{DP}^2$ where $\mu_{DP}$ is the true range $\sqrt{(x_r-x)^2+(y_r-y)^2}$, assumed to be a deterministic unknown quantity. On the other hand, the $i^{th}$ biased estimate must have a GLssian pdf $N(\mu_{MP,i},\sigma_{MP,i}^2)$, where the mean $\mu_{MP,i}=\mu_{MP,i}+l_i$, for i+1, ..., N. It can be assumed that no a priori statistic of $l=(l_1, l_2, \ldots, l_N)^T$ is available.

Since MP, Multipath, signals add a large positive bias to the true range, it can be expected that the measured range has a skew distribution. To test if MP signals are present, certain outlier tests can be employed.

Skewness and Kurtosis Test:

When a normal sample with an unknown mean contains some observations, which have a shift in the mean (also unknown) in the same direction, the locally best invariant single-sided test for detecting MP signals can be the Skewness test. The third moment of skewness test is based on the skewness, which is defined as:

$$\text{Skewness} = \frac{1}{T_s}\sum_{i=1}^{T_s}\left(\frac{x_i - \bar{x}}{\sigma}\right)^2 \quad (4)$$

where $T_s$ is the number of $x_i$ samples
$\bar{x}$ is the average of the samples
$\sigma$ is the standard deviation When the Skewness is greater than zero, the data is skewed to the right of the mean and vice versa. When less than 21% of the observations are normal with a shift in the mean, regardless of direction, then the Kurtosis test, which is based on the fourth moment, is the locally best invariant test for detecting outliers. In other words, the Kurtosis test is based on the value of the Kurtosis, which is defined as:

$$\text{Kurtosis} = \frac{E(x_i - \mu)^4}{\sigma^4} \quad (5)$$

where $\mu$ is the mean value of $x_i$

The Skewness and Kurtosis tests can lead to acceptance or rejection of one of the hypotheses at some significant level. However, while using moment based tests, problems might arise when a skewed distribution has odd moments of zero or when a non-normal density has a kurtosis of three, similar to a Gaussian distribution.

Reliability Analysis (A Posterior Outlier Detection):

From normal probability theory, residuals are expected to be small and randomly distributed. Although residual sizes can suggest observational errors, they do not necessarily identify the observations that contain outliers. This is due to the fact that Least Squares (LS), which is a common estimation method used in wireless location, generally spreads a large observational error or outliers out radially from its source. However, this condition is not unique to LS since any closed form estimation method will also spread a single observational error throughout the entire observational set.

Example 1

Problem Formulation Based on the Skew-Normal Distribution

In the present example, a radio device can be used that can receive a radio signal transmitted from a number of RSs. The best location estimate of the radio device can be obtained by processing the delay estimates obtained only from DP signals.

As discussed, a type of distribution called the SN distribution is used. SN refers to a parametric class of probability distributions, which can include the Gaussian distribution among others. The SN class of densities extends the normal distribution model by allowing a shape parameter to account for its skewness. In this Example, the PDF of the SN distribution can be given by $$f(x; \sigma, \mu, \lambda) = \frac{2}{\sigma}\varphi\left(\frac{x-\mu}{\sigma}\right)\Phi\left(\lambda\frac{x-\mu}{\sigma}\right) \quad (6)$$

where φ and Φ represent the PDF and the cumulative density function (CDF) of the Gaussian distribution, respectively, and λ is a real number which indicates the skewness of the distribution. If λ is a positive number, the SN distribution is positively skewed, while a negative λ indicates that the SN distribution is negatively skewed.

Some basic properties of the SN distribution are as follows:
1) When λ=0, the SN (μ, σ, λ) distribution becomes a Gaussian distribution N(μ, σ).
2) When λ→±∞, the SN(μ, σ, λ) distribution tends to the half-normal distribution.
3) For any positive value of λ, the SN(μ, σ, λ) can be modeled as a positively skewed distribution. Therefore, the SN distribution matches the analytical derivations and the experimental studies, in which:
   i. When only DP signals are present, its distribution is Gaussian, which is the case when λ=0
   ii. When MP signals are present, the "Fisher Information Matrix" (FIM) is singular, which is the case when λ→±∞, since in this case, the corresponding distributions are half-normal.
   iii. One of the analytical studies assumed that the distribution in the case of MP signals belong to a Gamma distribution, while many experiments modeled the MP distribution as other distributions as discussed above. All such distributions can be grouped under the class of the SN distribution.

The present Example utilizes a "SNOD" technique based on the SN(μ, σ, λ) distribution to be used to detect MP signals. The Skew-Normal Outlier Detection (SNOD) Technique
Binary Hypothesis There can be two scenarios per received delay estimate: A DP scenario where the propagation delay estimate is unbiased AWG, and a MP scenario where the propagation delay estimate is biased AWG. First, six possible location estimates or "crossings" can be determined, whereby a crossing is formed from the intersection of three circles as shown in FIG. 2. There can be a minimum number of RSs required to obtain a unique solution for the DS position $p=(x,y)^T$. Each circle or region in FIG. 2 is centered around a RS and its radius corresponds to the time delay estimate of the signal traveling from the RS to the DS. Two types of crossing are defined, namely, clustered crossings and non-clustered crossings. FIG. 2 shows three clustered crossings (dark circles), and three non-clustered crossings (open circles). The two types of crossings originate from the fact that every two intersecting circles cross in a maximum of two points. Over a noiseless DP channel, one of the two intersection points correspond to the position of the radio device while the second correspond to an ambiguity solution. In order to remove the ambiguity, a third circle is required. Over an AWGN DP signal channel, the three clustered crossings are unbiased estimates of the position of the radio device while the three non-clustered crossings are biased estimates of the position of the radio device.

Figure 3:
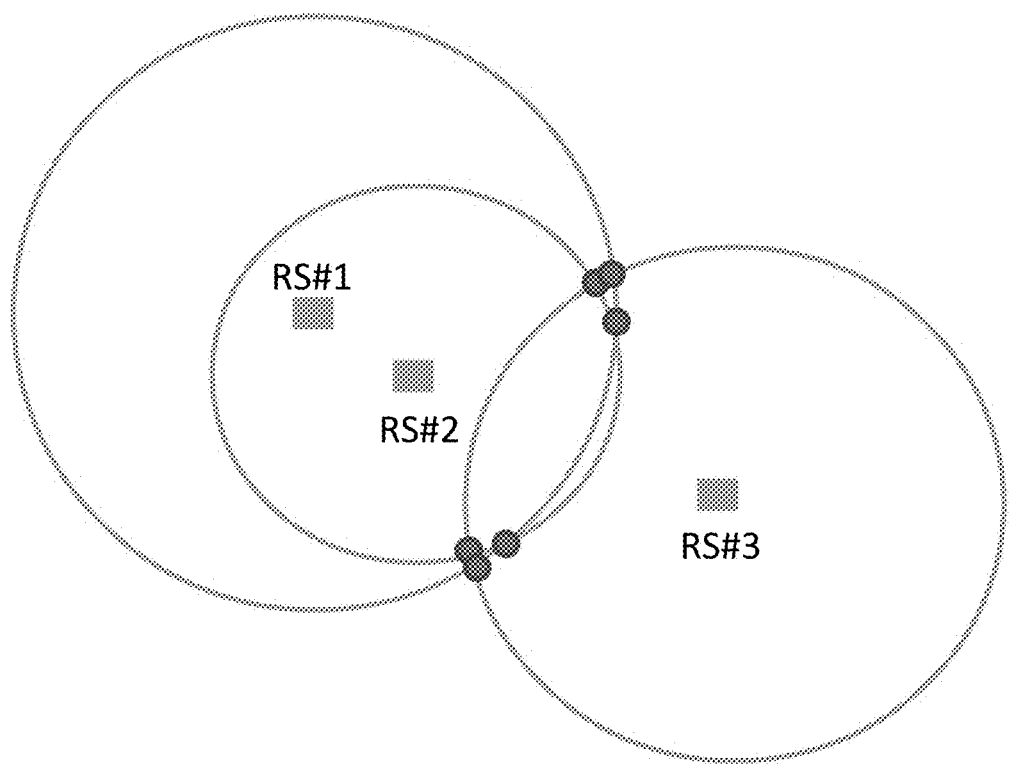
FIG. 3 shows two cluster sets that are formed, wherein each cluster set consists of three crossings, as might occur in a scenario having poor RSs geometry.

The type of crossings in FIG. 2 are not unique. For instance, FIG. 3 shows a second type of crossings, where there are two sets of "clustered crossings". Over an AWGN DP channel, only one set of the clustered crossing corresponds to unbiased AWG estimates of the position of the radio device. The second set of clustered crossing, which corresponds to biased estimates of the position of the radio device, will be referred to as the set of "bifurcating crossings". It is further contemplated that circumstances can arise where one or more regions (circles) do not intersect, however, for the purpose of this Example, only those circumstances where such intersection occurs shall be considered.

In the present Example, there are at least six crossings for each set of three RSs. Each crossing can be associated with a position estimate $\hat{p}$ which has two elements: $\hat{x}_p$ and $\hat{y}_p$ ($\hat{x}_p$, $\hat{y}_p$) can be modeled as having a bivariant SN distribution. For the sake of simplicity, $\hat{x}_p$ or $\hat{y}_p$ a will be considered individually as having a univariant SN distribution defined as $SN(\mu_p, \sigma_p, \lambda_p)$. If the received signals, which are used to estimate the DS position are DP signals, the PDF of the estimated position, $\hat{p}_{DP}$, belongs to $SN(\mu_p, \sigma_p, \lambda_p)$. On the other hand, when at least one of the RSs, which is used to locate the radio device, encounters a MP condition, the PDF of the estimated position, $\hat{p}_{MP}$, belongs to $SN(\mu_p, \sigma_p, \lambda_p)$, where $\lambda_p \neq 0$ Therefore, (6) can be tuned to model the detection problem as follows:

$$H_0: \lambda_p=0, \hat{p}_{DP} \qquad (7)$$

$$H_1: \lambda_p \neq 0, \hat{p}_{MP}$$

In the next subsection, the proposed method to distinguish the SN distributions according to (7) will be presented.

Test of Skewness

In this section, the common statistics that are used to define the middle or the center of a distribution are provided. The mean is currently the best-known center of a distribution, while the median is known to be the middle of the distribution. For a Gaussian distribution, the mean and the median are known to be asymptotically equal i.e. for an infinite number of samples. However, for a finite number of samples, the mean and median are very close but not necessarily equal. The difference between the mean and the median may be utilized to examine the skewness of the distribution of a random variable. In other words, it can be detected whether $\lambda_p$ is equal to zero or not based on:

$$|\text{mean} - \text{median}| \underset{H_0}{\overset{H_1}{\gtrless}} \delta \qquad (8)$$

where $\delta$ is a threshold to be estimated and $H_0$ and $H_1$ are defined in (7).

The Proposed Receiver for Wireless Location

Figure 4:
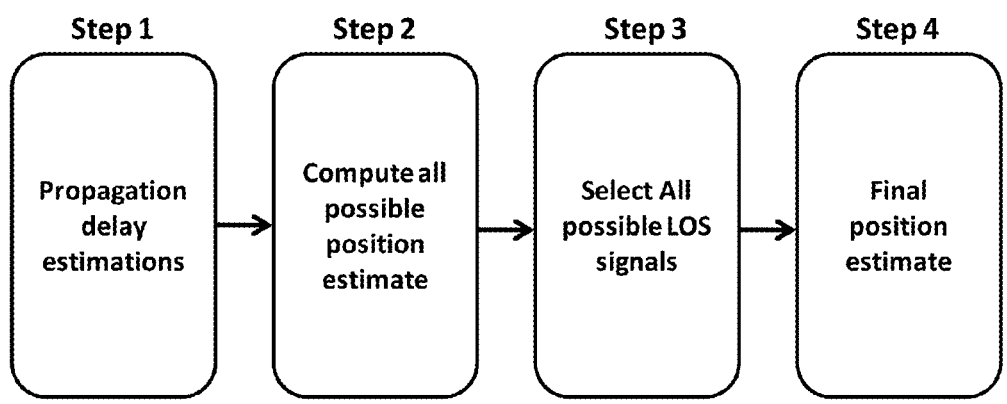
FIG. 4 shows a diagram of an embodiment of the wireless location method and device as described herein, where 'LOS' refers to Line of Sight.

The four steps of an embodiment of a proposed wireless location receiver as shown in FIG. 4 are provided. The proposed technique is based on the assumption that redundancy exists in the number of RSs that are visible to the radio device to be located. In other words, it is assumed that more than three RSs form intersecting circles.

Step 1: Generally speaking, the receiver of the radio device is responsible to estimate the time delay corresponding to the DP signal received from each visible RS. By way of example, the propagation delay estimation technique can be utilized to estimate the time delay for the signal received from each visible RS. It is considered that the propagation delay estimation technique can provide more than one estimate for the time delay of each received signal. This can be generalized to include any number of estimates generated from any time delay estimator (e.g., Matched filter or correlator followed by a peak detectors).

Step 2: Using all delay estimates, $\hat{\tau}_{i1}$ and $\hat{\tau}_{i2}$ for example, for i=1, ..., R from step 1, a circle or region centered at each corresponding RS can be formed per estimate. Hence, six crossings for each set of three intersecting circles can be obtained. Equation (8) gives the number of combinations of three RSs by taking three circles out of a total of n:

$$\frac{n!}{(n-3)!3!} \qquad (9)$$

where n is the total number of delay estimates, which is equal to two R according to FIG. 4.

Step 3: For each set of three intersecting circles or regions, the three non-clustered crossings can be detected using the skewness test. This can be accomplished as follows. Given the fact that there are six crossings per three intersecting circles or regions, twenty combinations of three crossings out of the six crossings can be formed. The skewness test can then be performed for each one of the twenty combinations of three crossings. If all three circles correspond to DP signals, with no bifurcation crossings, only the three clustered crossings pass the test. If any one of the three circles corresponds to a biased time delay estimate, there will be no combinations of crossings that will pass the skewness test. If all three circles correspond to DP signals with bifurcation crossings, both sets of clustered crossings will pass the skewness test. Accordingly, the occurrence of bifurcation can be detected. In order to decide which set of clustered crossings is non-bifurcating, two possible treatments are available: 1) discard such a set of crossings due to its poor geometry, or 2) find the median of the other sets of crossing combinations that do not bifurcate and choose from the set of crossings which are encountering bifurcation the set of crossings that are close to such a median value.

Circumstances can arise where two of the circles with outliers, are approximately equal in magnitude but of opposite directions. In such a case, different sets of crossings can pass the skewness test. If this happens, the RS selection process encounters a conflict in selecting the RSs, hence, a second stage statistical test, which tests the standard/median deviation of the selected sets can be conducted. The standard deviation examines the dispersion of the data. Hence, the set, which has two outliers with approximately equal magnitude but opposite directions, is expected to have a smaller standard deviation.

Step 4: In this step, the selected RSs from step three are used to find a final location estimate. When the number of selected RSs is three, a unique solution is available. When the number of selected RSs is less than three, an infinite number of solutions is available. When the number of selected RSs is more than three, no solution is available. In the last case, a Least Square Estimator (LSE) can be used to find a solution after linearizing (3).

The four steps in the SNOD technique are illustrated through the following three scenarios.

Example 1

Scenario 1

Step 1: The case of four intersecting circles $\{C_1, C_2, C_2, \text{ and } C_4\}$ is considered.
Step 2: All sets of six crossings, using three circles per set, is computed

| Set 123: | $C_1$ | $C_2$ | $C_3$ |
| Set 124: | $C_1$ | $C_1$ | $C_4$ |
| Set 134: | $C_1$ | $C_3$ | $C_4$ |
| Set 234: | $C_2$ | $C_3$ | $C_4$ |

Step 3: A skewness test for each of the twenty combinations of three crossings for Set 123 is performed. If a combination passes the skewness test, the combination can be used to estimate the true position of the device. By repeating the skewness test for Set 124, Set 134, and Set 234, all combinations that pass the skewness test may be obtained.
Step 4: All combinations identified from the last step are used to find the final position estimate for the radio device using LSE.

Example 1

Scenario 2

Step 1: The case of five intersecting circles $\{C_1, C_2, C_3, C_4 \text{ and } C_5\}$, where $\{C_4 \text{ and } C_5\}$ corresponds to the same RS, say $RS^4$ (i.e. the circle $C_4$ has a radius $\hat{\tau}_{41}$ and the circle $C_5$ has a radius $\hat{\tau}_{42}$), is considered (i.e. the present method and apparatus may consider a scenario having multiple correlation peaks per one RS).
Step 2: All sets of six crossings, using three intersecting circles per set, are computed.

| Set 123: | $C_1$ | $C_2$ | $C_3$ |
| Set 124: | $C_1$ | $C_2$ | $C_4$ |
| Set 125: | $C_1$ | $C_2$ | $C_5$ |
| Set 134: | $C_1$ | $C_3$ | $C_4$ |
| Set 135: | $C_1$ | $C_3$ | $C_5$ |
| Set 145: | x | x | x |
| Set 234: | $C_2$ | $C_3$ | $C_4$ |
| Set 235: | $C_2$ | $C_3$ | $C_5$ |
| Set 245: | x | x | x |
| Set 345: | x | x | x |

It should be noted that $\{C_4 \text{ and } C_5\}$ are not used simultaneously in one set. Step 3 and Step 4 are the same as in the previous scenario.

Example 1

Scenario 3

The case of five circles used to estimate the position of a radio device is presented. In this scenario, two methods for Step 2 are contemplated, namely, Method A: choose sets of three circles to fix the position of the device, and Method B: choose sets of four circles to fix the position of the device. The robustness of the two cases is presented:
Case I: Only one biased time delay estimate is present,
Case II: Two biased time delay estimates are present.
Step 2: Method A: choosing all sets of three circles, there are eight sets: Set 123, Set 124, Set 125, Set 134, Set 135, Set 234, Set 235, and Set 345
Method B: choosing all sets of four circles, there are five sets: Set 1234, Set 1235, Set 1245, Set 1345, and Set 2345
Case I: One biased time delay estimate exists corresponding to $C_1$
In Method A: Set 234, Set 235, and Set 345 will pass the skewness test performed in Step 3, and three circles will be selected in Step 4.
In Method B: Only Set 2345 will pass the skewness test performed in Step 3, and Step 4 will not add anything in this case.
Case II: Two biased time delay estimate exist corresponding to $C_1$ and $C_2$
In Method A: Only Set 345 will pass the skewness test performed at Step 3, and Step 4 will not add anything in this case.
In Method B: no sets will pass the skewness test performed in Step 3.
This scenario demonstrates that the selection of the minimum number of RSs (i.e. three) provides for better RS selectivity and therefore, provides for improved robustness against biased time delay estimates.
This can be explained from the following simple rule $$n_b \leq n - n_i \qquad (10)$$

where
$n_b$ is the number of biased circles to be detected
$n_i$ is the number of intersecting circles in Step 2.
n is the total number of circles, RSs.
In order to maximize $n_b$, $n_i$ must be minimized which in this case, corresponds to three.
Results
In this section, the performance of the proposed SNOD technique is evidenced. The parameters of the present simulation environment are summarized in Table 1, and the four steps described above are followed, using $n_i=3$, hence generating six crossings in Step 2.

TABLE 1

| Parameter | Value |
| --- | --- |
| BW | 50 MHz |
| Tx Power | 0 dBm |
| large time delay error (outlier) | 2-8 μs |
| position of $RS^1$ | $(0,0)_m$ |
| position of $RS^2$ | $(10,150)_m$ |
| position of $RS^3$ | $(120,900)_m$ |
| position of $RS^4$ | $^c(500,700)_m$ |
| position of DS | $(30,300)_m$ |

In this section, the performance of the SNOD technique with respect to the Probability of Detection ($P_\downarrow D$) and the Probability of False Alarm ($P_{FA}$), is demonstrated. Two different types of probability of detection are utilized: 1) the Probability of total Detection ($P_{D_t}$) which is defined as the probability of detecting all DP RSs and rejecting all RSs that are encountering MP signals, and 2) the Probability of partial Detection ($P_{D_p}$) which is defined as the probability of detecting some DP RSs.

Only One Circle Per RS

Figure 5:
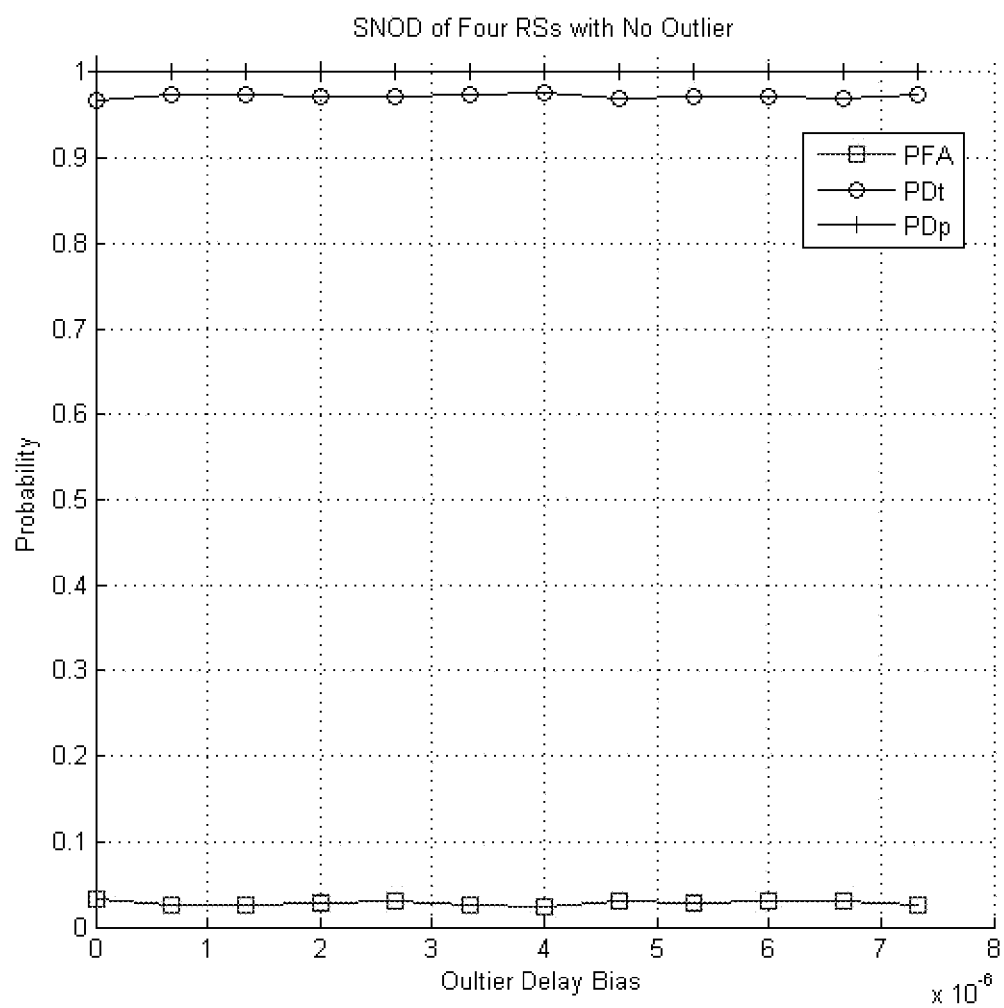
FIG. 5 demonstrates the results of an embodiment of the present method for four RSs when there are zero outliers, where 'SNOD' refers to Skew-Normal Outlier Detection, where 'PFA' refers to the Probability of False Alarm, where 'PDt' refers to the Probability of total Detection, and where 'PDp' refers to the Probability of partial Detection.
Figure 6:
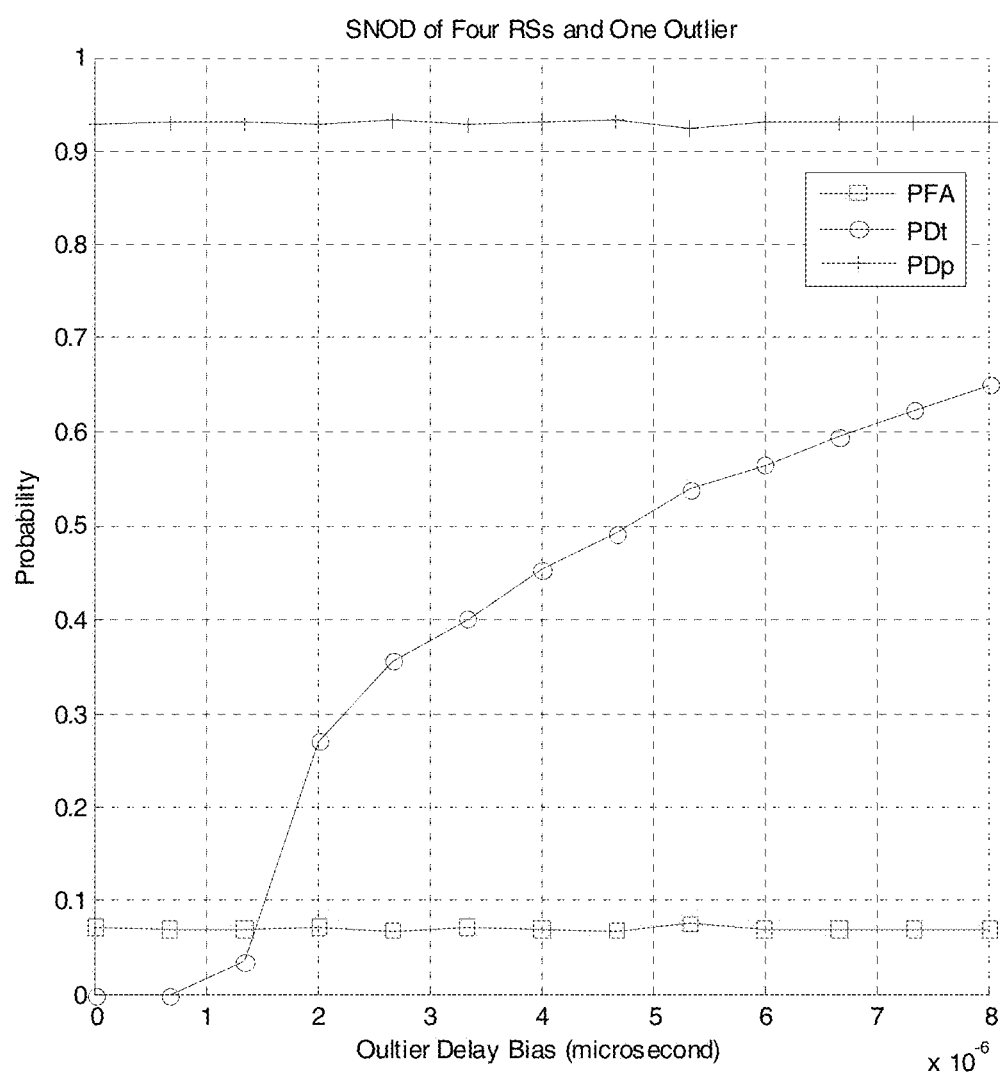
FIG. 6 demonstrates the results of an embodiment of the present method for four RSs when there is one outlier.
Figure 7:
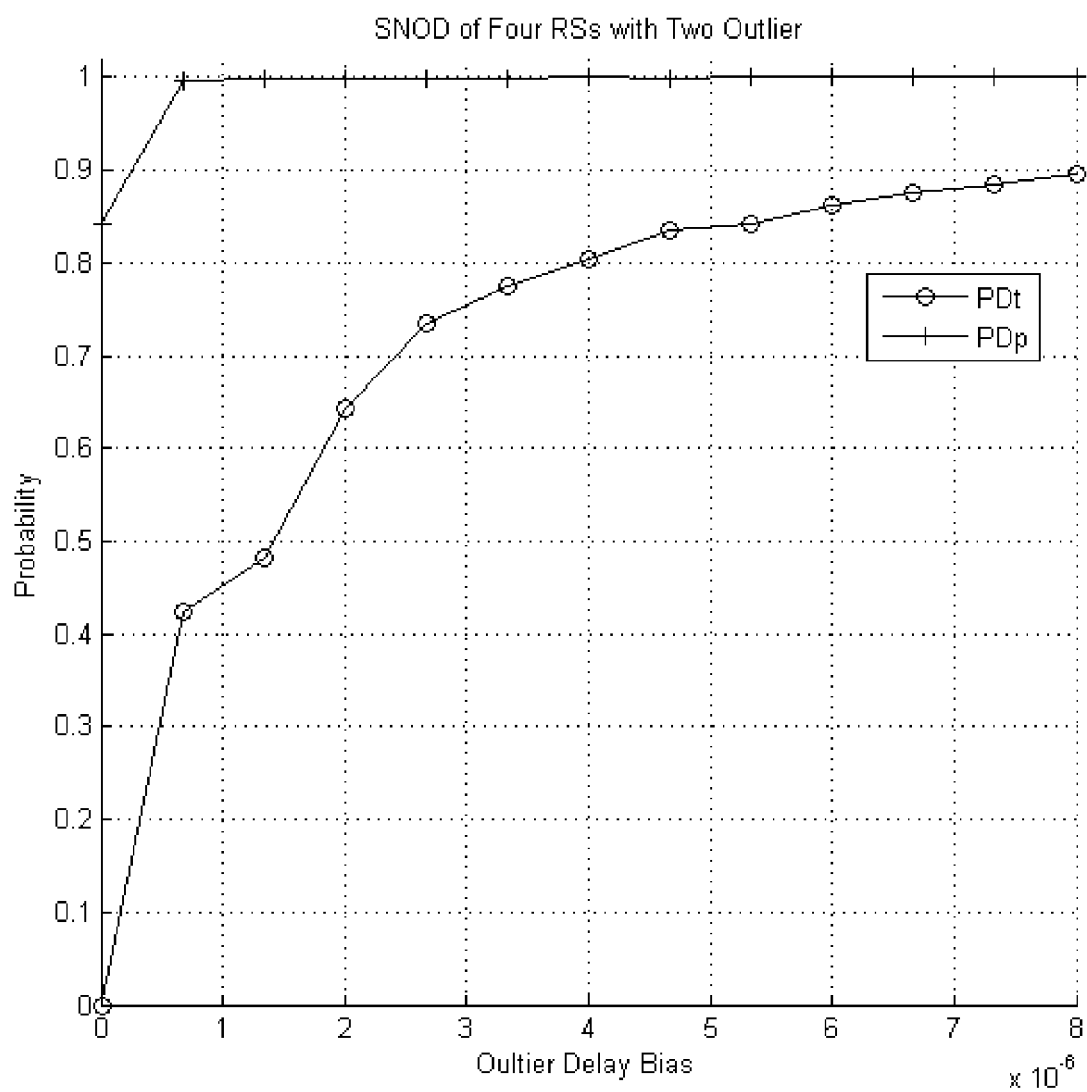
FIG. 7 demonstrates the results of an embodiment of the present method for four RSs when there are two outliers.
Figure 8:
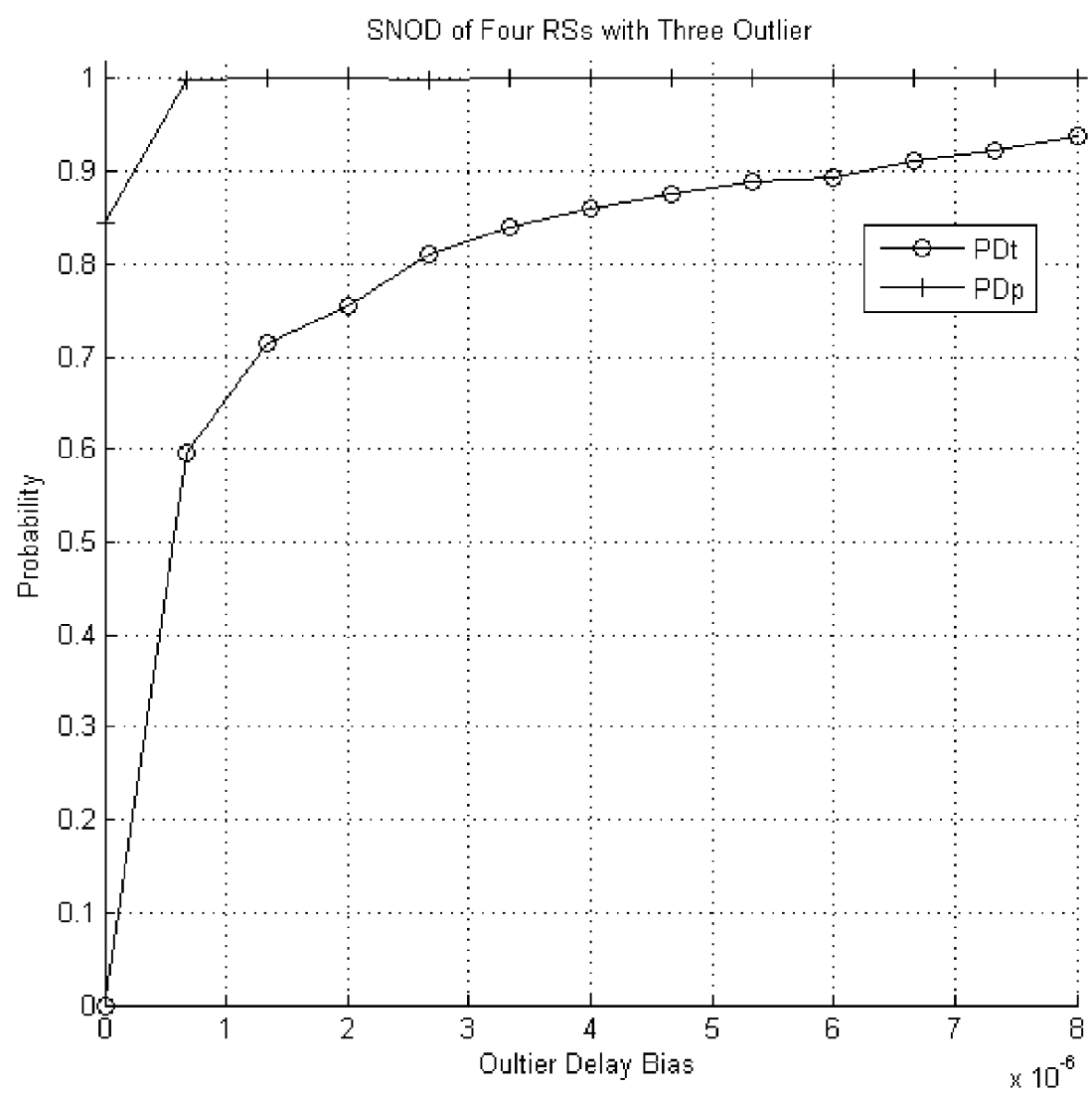
FIG. 8 demonstrates the results of an embodiment of the present method for four RSs when there are three outliers.
Figure 9:
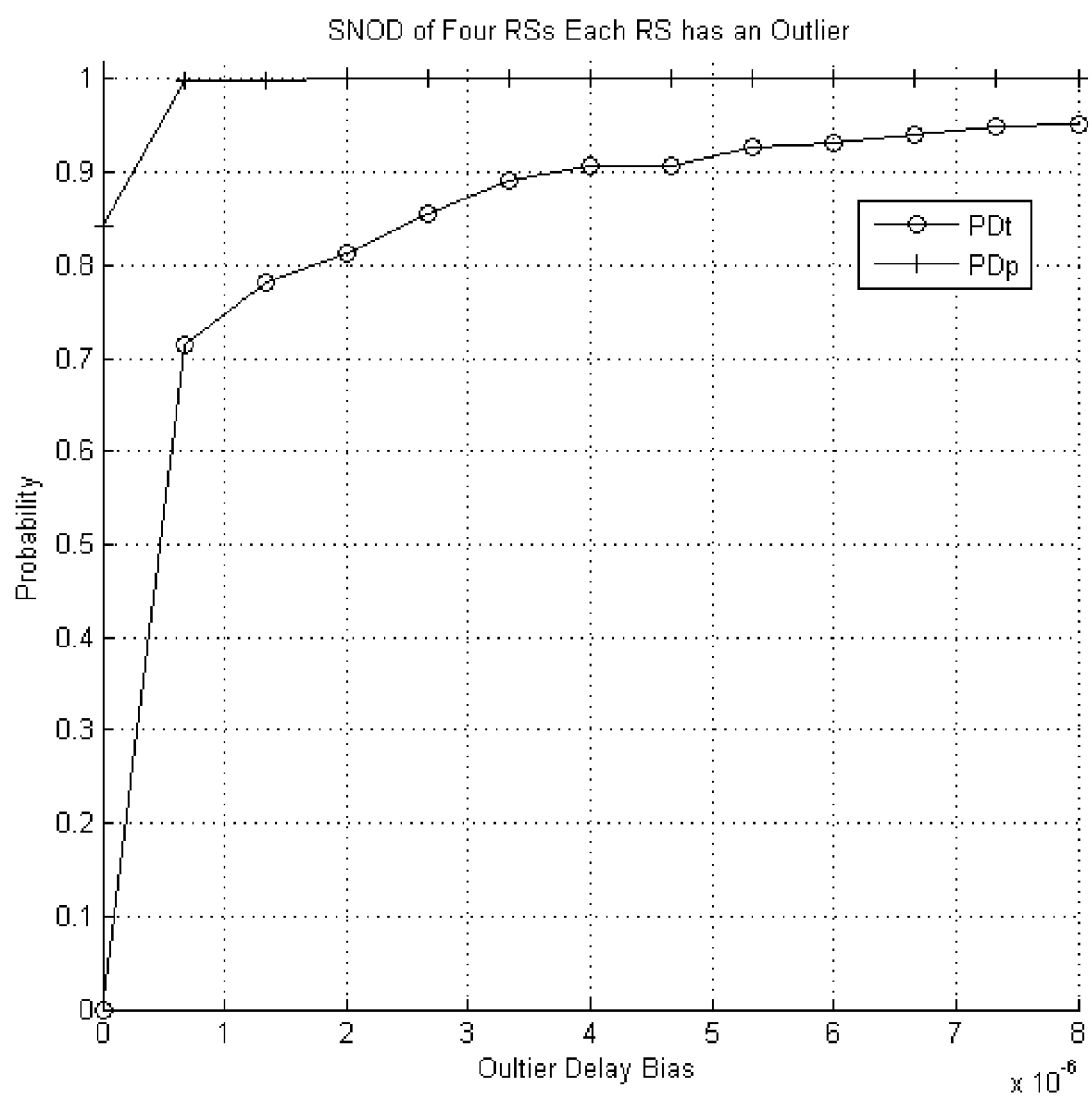
FIG. 9 demonstrates the results of an embodiment of the present method for four RSs when there are four outliers.

FIGS. 5, 6, 7, 8 and 9 demonstrate the SNOD technique for four RSs when there is zero, one, two, three, or four outliers, respectively. The threshold value is chosen to keep the $P_{FA}$ below 10%. FIG. 5 demonstrates that the $P_{D_t}$ for the RSs that are not encountering an outlier is over 95%, while the $P_{D_p}$ is 100% in this case. FIG. 6 shows that the $P_{D_p}$ is almost 93% while the $P_{D_t}$ reaches 40% when a MP signal follows the LOS signal by 3 (s. The $P_{D_t}$ reaches 65% when the MP signal follows the LOS signal by 8 (s. FIG. 7 shows that for two outliers, the $P_{D_p}$ after 0.06 (s is 100%, while the $P_{D_t}$ reaches 80% and 90% when the MP signal follows the LOS signal by 4 and 8 (s, respectively. FIGS. 8 and 9 show that as the number of outliers increases the $P_{D_t}$ also increases. Further, FIG. 8 shows that at 1 (s with three outliers, the $P_{D_t}$ reaches 65%, while for four outliers, the $P_{D_t}$ reaches 75% as shown in FIG. 8. The $P_{D_p}$ for two, three, or four outliers are all almost the same.

Multiple Circles Per RS

Figure 10:
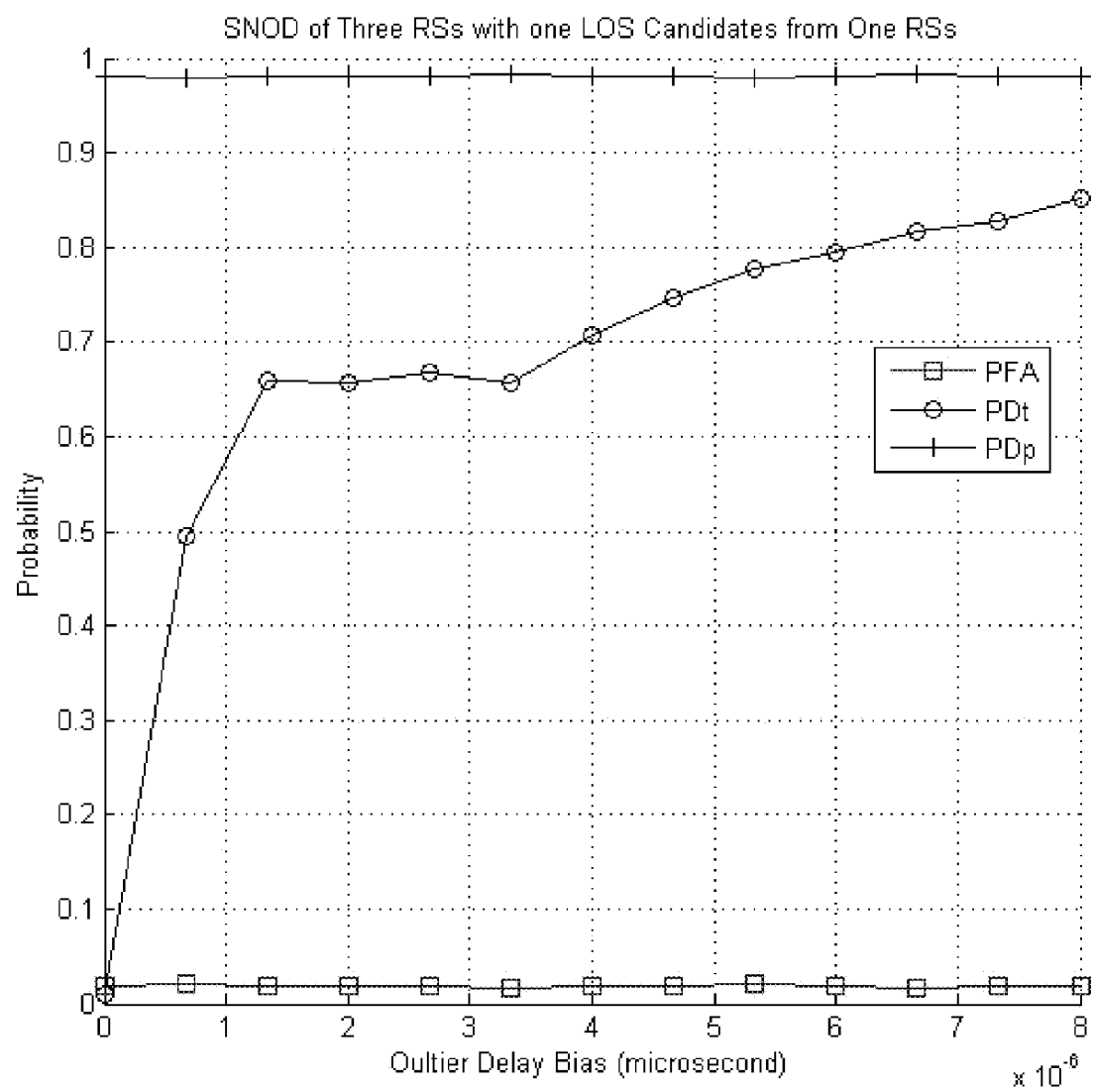
FIG. 10 demonstrates the results of an embodiment of the present method in the presence of multiple propagation delay estimates for three RSs, where one of the RSs has a propagation delay estimate.
Figure 11:
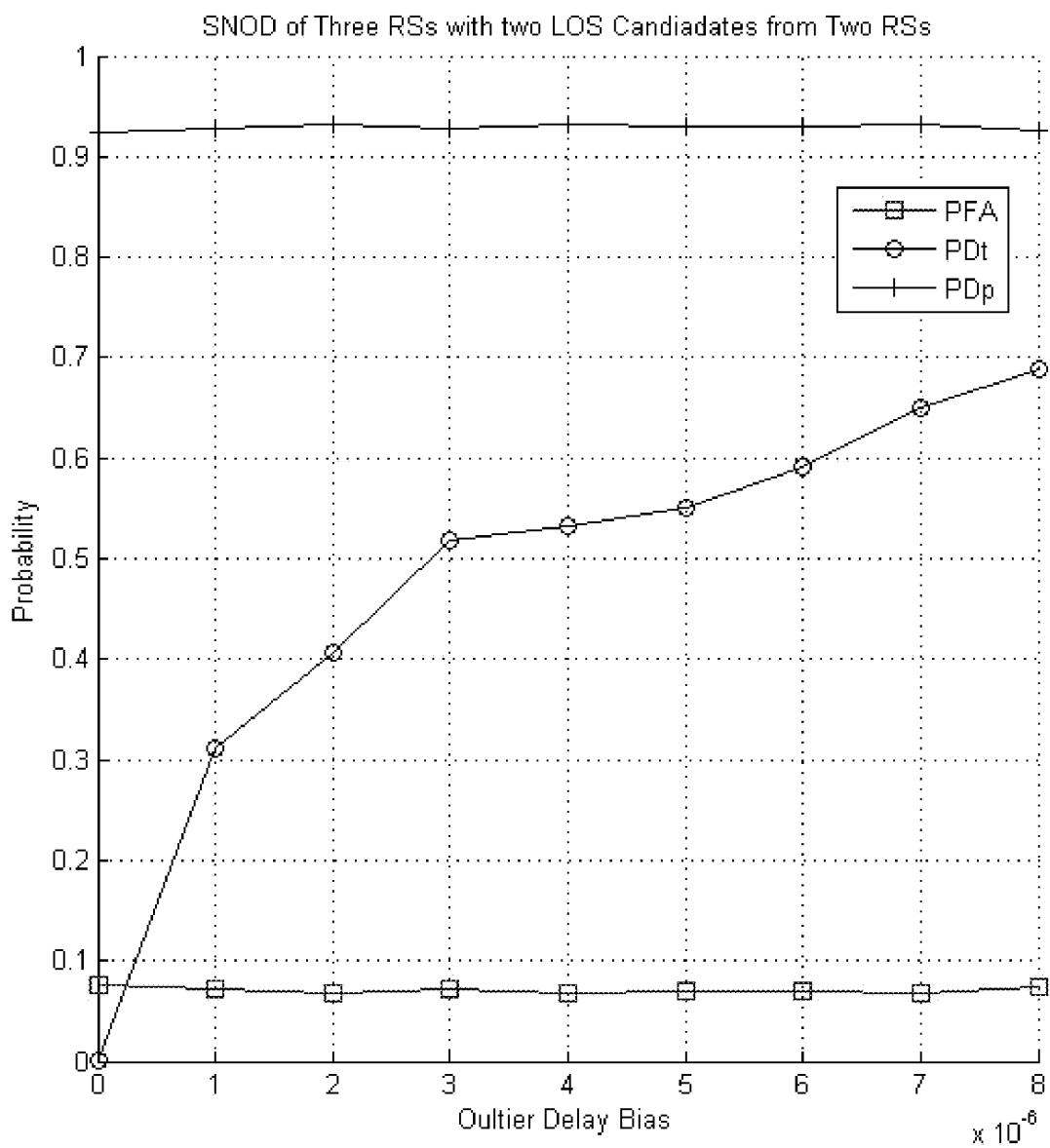
FIG. 11 demonstrates the results of an embodiment of the present method in the presence of multiple propagation delay estimates for three RSs, where two of the RSs have propagation delay estimates.
Figure 12:
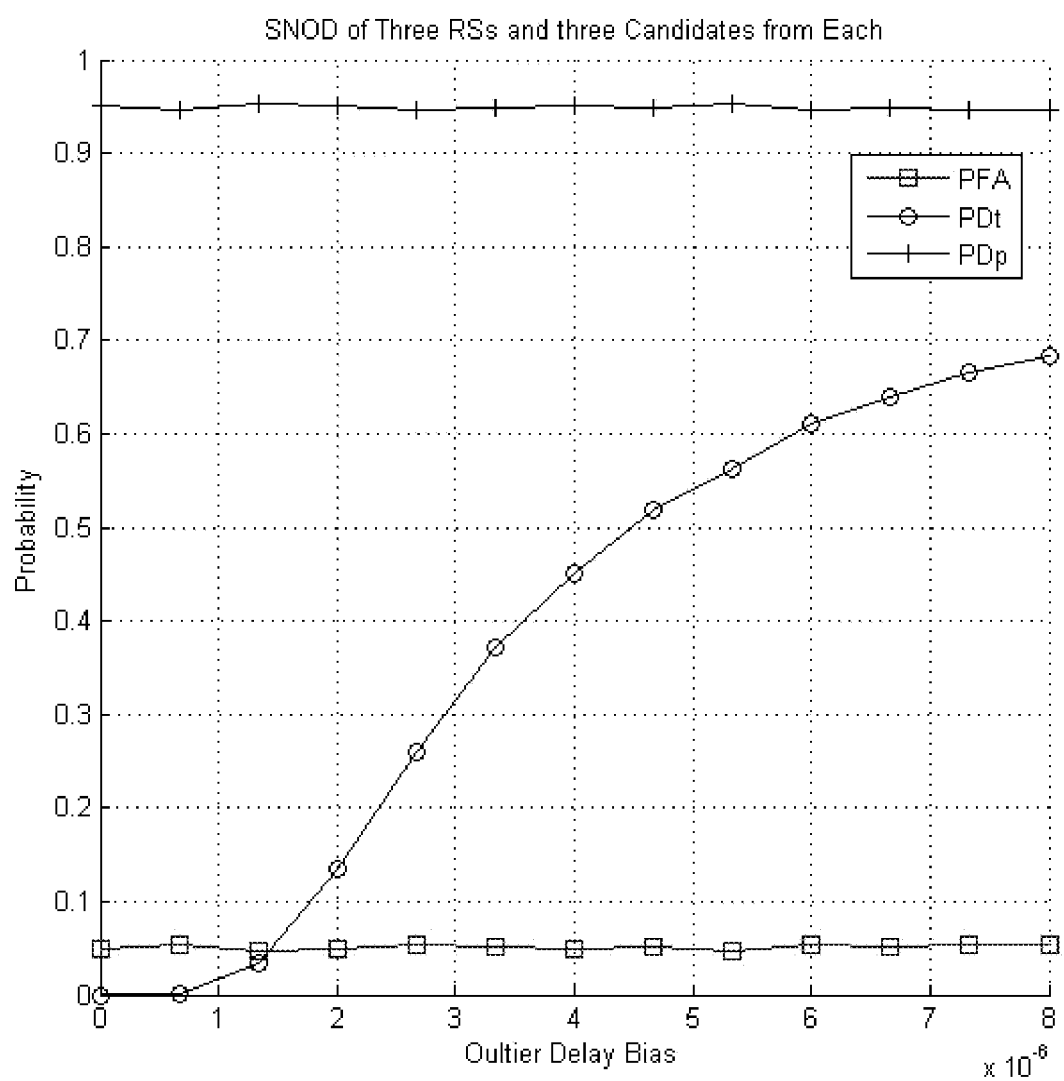
FIG. 12 demonstrates the results of an embodiment of the present method in the presence of multiple propagation delay estimates for three RSs, where each of the three RSs have propagation delay estimates.

FIGS. 10, 11 and 12 demonstrate the performance of the SNOD technique in the presence of multiple propagation delay estimates for a RS. In these three circumstances, three RSs, in which multiple delay estimates are available. FIG. 10 shows the performance of the SNOD technique with three RSs, one of them with two delay estimates, and shows that the $P_{FA}$ is less than 5%, while the $P_{D_p}$ is almost 98%. The $P_{D_t}$ increases as the MP signal is delayed from the actual LOS signal, and the $P_{D_t}$ reaches 68%, when the MP signal is delayed around 1.2 (s. FIG. 11 demonstrates the performance of SNOD technique when two RSs have two propagation delay estimates. The $P_{FA}$ is less than 10%, while the $P_{D_p}$ is almost 92%. The $P_{D_t}$ reaches 52%, when the MP signal is delayed by 3 (s. FIG. 12 demonstrates the performance of SNOD technique when three RSs have two propagation delay estimates. The $P_{FA}$ is less than 10%, while the $P_{D_p}$ is almost 94%. The $P_{D_t}$ reaches 55%, when the MP signal is delayed by 5 (s relative to the actual DP signal.

Up to Two Circles Per RS

Figure 13:
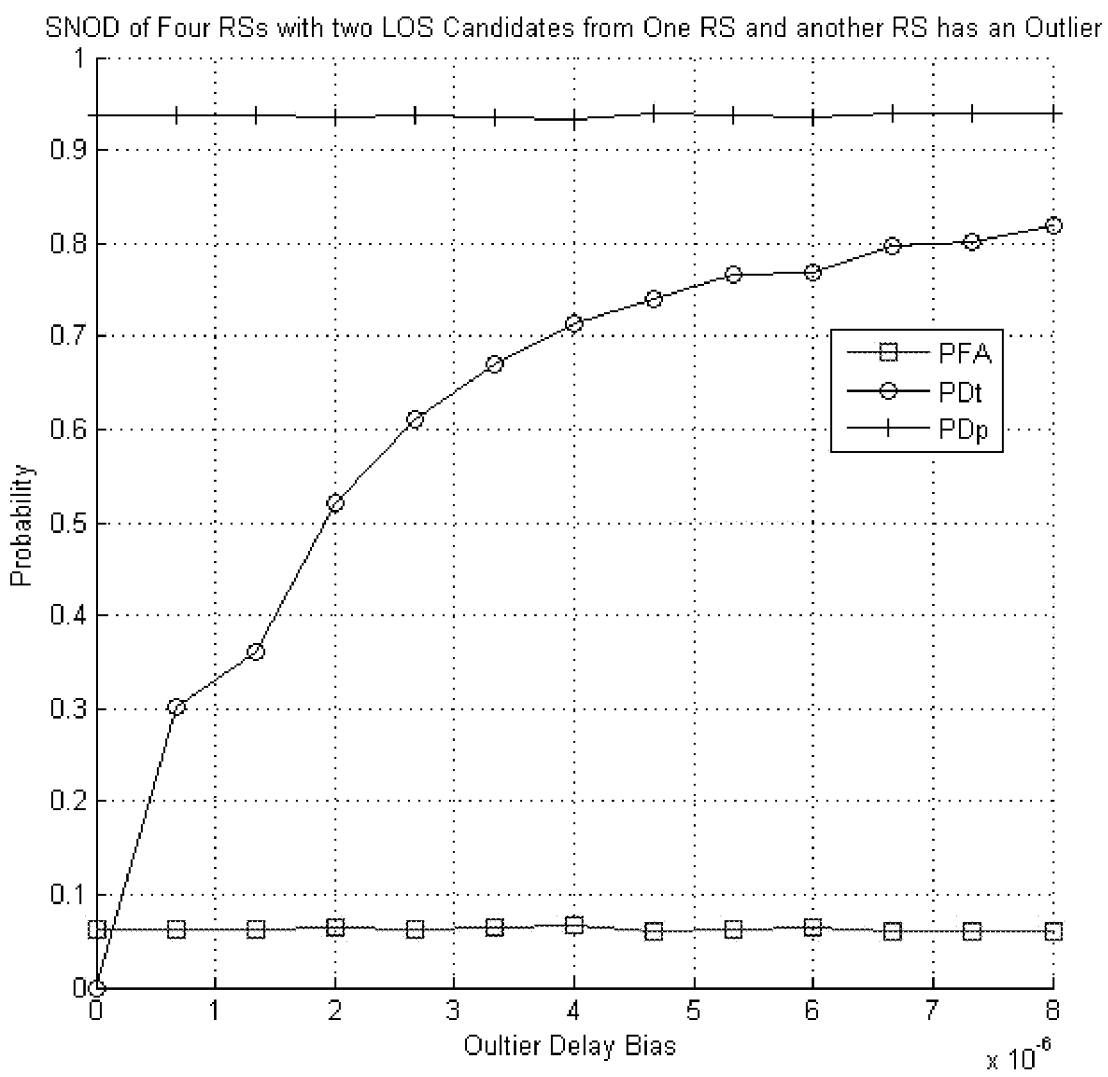
FIG. 13 demonstrates the results of an embodiment of the present method for four RSs.

FIG. 13 demonstrates the performance of the SNOD technique for four RSs. One of these RSs has an outlier, while another RS has two propagation delay estimates. The $P_{FA}$ is less than 10%, while the $P_{D_p}$ is almost 94%. The $P_{D_t}$ reaches 55%, when the MP signal is delayed by 2 (s relative to the actual DS signal.

This Example 1 demonstrates a wireless location receiver based on the SNOD technique, and proposes the use of the SN distribution as a general distribution model for multipath (MP) signals. When the RS has two propagation delay estimates, two time, delay estimates per RSs may be used. The foregoing results demonstrate the capacity of the SNOD technique in detecting outliers.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A method for determining the location of a device, wherein the device is capable of receiving/transmitting wireless signals from/to reference stations, the method comprising:
   providing wireless signals in the form of range information to the device, from at least three reference stations;
   determining a region or area surrounding each reference station, wherein each region surrounding each reference station intersects with at least one region surrounding at least one other reference station to form at least one intersecting space;
   defining the at least one intersecting space to delineate a device location search space;
   determining locations of the device within the device location search space;
   determining combinations of said device locations, and using a distribution analysis test to examine a skewness value of each combination;
   using the skewness values to eliminate and disqualify data points from a set by selecting the combinations of device positions that result in a minimum skewness value or a combination that provides a skewness value less than a pre-defined minimum threshold value; and
   utilizing the selected combinations to determine a refined final position of the device.

2. The method of claim 1, wherein the wireless signal range information is selected from the group consisting of radio signals and sound signals.

3. The method of claim 1, wherein the reference station comprises a station having known coordinates selected from the group consisting of Cellular Base-Stations, GNSS satellite, WLAN/Wi-Fi Routers, and Base-Stations for Network-based location.

4. The method of claim 1, wherein the ranging information is processed and extracted by a super-resolution technique.

5. The method of claim 1, wherein the region surrounding the reference station is in the form of a circle, having a diameter or radius that may be determined.

6. The method of claim 1, wherein the distribution analysis test comprises a mean minus median analysis.

7. The method of claim 6, wherein the mean is a sampled mean and the median is a sampled median.

8. The method of claim 6, wherein the mean minus median analysis comprises:

$$|\text{mean} - \text{median}| \underset{H_o}{\overset{H_1}{\gtrless}} \delta$$

where $\delta$ is a threshold to be estimated and $$H_0: \lambda_p = 0 \cdot \hat{\rho}_{DP}$$

$$H_1: \lambda_p = 0 \cdot \hat{\rho}_{DP}.$$

9. The method of claim 1, wherein the distribution analysis test comprises a conventional skewness and Kurtosis analysis.

10. The method of claim 1, wherein the pre-defined minimum threshold value is based on system design parameters selected from the group consisting of system bandwidth and minimum target SNR.

11. The method of claim 1, wherein the location of the device is determined in scenario selected from the group consisting of a two-dimensional (2D) scenario and a three-dimensional (3D) scenario.

12. The method of claim 1, wherein the location of the device is determined by providing any processing or computation steps at the device itself.

13. The method of claim 1, wherein the location of the device is determined by providing any processing or computation steps at a network server.

14. The method of claim 1, wherein the location of the device is determined by having the device collect at least one raw digitized signal and send the at least one raw digitized signal back to a hosted-server using TCP/IP protocol, where any processing or computation steps take place on the hosted-server.

15. A device capable of receiving/transmitting wireless signals in the form of range information from/to a reference station, the device comprising:
  receiver/transmission means for receiving/transmitting wireless signals from/to at least three reference stations;
  processing means capable of receiving the wireless signals and:
    determining a region or area surrounding each reference station, wherein the region surrounding one reference station intersects with at least one region surrounding at least one other reference station to form at least one intersecting space;
    defining the at least one intersecting space to delineate a device location search space;
    determining locations of the device within the receiver location search space;
    determining combinations of said receiver locations, and using a distribution analysis test to examine a skewness value of each combination;
  using the skewness values to eliminate and disqualify data points from a set by selecting the combinations of device positions that result in a minimum skewness value or a combination that provides skewness value less than a pre-defined minimum threshold value; and
  utilizing the detected and selected combinations to determine a refined final position of the device.

16. The device of claim 15, wherein the device is selected from the group consisting of a portable radio device, a mobile phone, a Global Positioning System device, and a beacon device.

17. The device of claim 15, wherein the device further comprises a processor capable of using techniques selected from the group consisting of Matched filter(s) and correlator(s), followed by a peak detector.

18. The device of claim 15, wherein the wireless signal range information is selected from the group consisting of radio signals and sound signals.

19. The device of claim 15, wherein the reference station comprises a station having known coordinates selected from the group consisting of Cellular Base-Stations, GNSS satellite, WLAN/Wi-Fi Routers, and Base-Stations for Network-based location.

20. The device of claim 15, wherein the distribution analysis test comprises a mean minus median analysis.

21. The device of claim 20, wherein the mean minus median analysis comprises:

$$|\text{mean} - \text{median}| \underset{H_o}{\overset{H_1}{\gtreqless}} \delta$$

where $\delta$ is a threshold to be estimated and $H_0: \lambda_p = 0 \cdot \hat{\rho}_{DP}$ $H_1: \lambda_p = 0 \cdot \hat{\rho}_{DP}$ 22. The device of claim 15, wherein the pre-defined minimum threshold value is based on system design parameters selected from the group consisting of system bandwidth and minimum target SNR.

* * * * *

UNITED STATES PATENT AND TRADEMARK OFFICE
CERTIFICATE OF CORRECTION

PATENT NO. : 8,792,908 B2  
APPLICATION NO. : 13/538672  
DATED : July 29, 2014  
INVENTOR(S) : Youssef et al.

Page 1 of 1

It is certified that error appears in the above-identified patent and that said Letters Patent is hereby corrected as shown below:

In the Claims:

In column 14, line 56, claim 8, delete "=", and insert therefor -- $\neq$ --.

In column 16, line 1, claim 15, delete "detected and".

In column 16, line 31, claim 21, delete "=", and insert therefor -- $\neq$ --.

Signed and Sealed this  
Fourteenth Day of October, 2014

Michelle K. Lee  
*Deputy Director of the United States Patent and Trademark Office*